US012560952B2

(12) United States Patent
Heo et al.

(10) Patent No.: US 12,560,952 B2
(45) Date of Patent: Feb. 24, 2026

(54) WATER PURIFIER

(71) Applicant: COWAY Co., Ltd., Gongju-si (KR)

(72) Inventors: Jin Ho Heo, Seoul (KR); Je Ho Lee, Seoul (KR); Byoung Phil Lee, Seoul (KR); Dong Hui Kim, Seoul (KR)

(73) Assignee: COWAY Co., Ltd., Gongju-si (KR)

( * ) Notice: Subject to any disclaimer, the term of this patent is extended or adjusted under 35 U.S.C. 154(b) by 163 days.

(21) Appl. No.: 18/644,763

(22) Filed: Apr. 24, 2024

(65) Prior Publication Data

US 2024/0377848 A1      Nov. 14, 2024

(30) Foreign Application Priority Data

May 10, 2023    (KR) ........................ 10-2023-0060695

(51) Int. Cl.
*C02F 1/00*        (2023.01)
*G05D 23/13*        (2006.01)

(52) U.S. Cl.
CPC ......... *G05D 23/1333* (2013.01); *C02F 1/001* (2013.01); *C02F 2209/02* (2013.01)

(58) Field of Classification Search
CPC ..... C02F 1/001; C02F 2209/02; G05D 23/13; G05D 23/1306; G05D 23/132; G05D 23/134; G05D 23/1333
See application file for complete search history.

(56) References Cited

U.S. PATENT DOCUMENTS

2023/0017924 A1 *    1/2023   Chauhan ............... F24H 15/281

OTHER PUBLICATIONS

KR 2013-0047783 (English translation) (Year: 2013).*
KR 2019-0003220 (Year: 2019).*

* cited by examiner

*Primary Examiner* — Jonathan Bradford
(74) *Attorney, Agent, or Firm* — Oblon, McClelland, Maier & Neustadt, L.L.P.

(57)            ABSTRACT

A water purifier includes: a water outlet unit; a water temperature sensor; a filter; a cold water module for cooling the purified water to provide cold water; a hot water module including a heater for heating water, and a hot water body providing a space which receives the hot water or through which the hot water flows; a flow channel connected to the water outlet unit, the filter, the cold water module, and the hot water module to provide a passage through which the purified water, the cold water, the hot water, and discharge water flow; a valve module that are selectively opened/closed to control the flow of water in the flow channel; and a controller for controlling the valve module such that a temperature of the water discharged from the water outlet unit measured by the water temperature sensor is a target temperature.

12 Claims, 6 Drawing Sheets

10

WATER PURIFIER

TECHNICAL FIELD

The present disclosure relates to a water purifier.

BACKGROUND

In general, a water purifier is a device that receives raw water from a raw water source such as tap water, filters the raw water into purified water through a filter provided therein, and then provides the purified water to a user. The water purifier may include a cold water module that cools room temperature purified water to a preset temperature and a hot water module that heats room temperature purified water. The water purifier can optionally provide any one of purified water, cold water, and hot water to a user depending on the user's choice.

However, since the conventional water purifier provides cold water and hot water to users at preset temperatures, it is cumbersome for the user to mix the cold water and the hot water provided by the water purifier to a desired temperature to use water at the desired temperature.

Against this background, a water purifier that can provide water at a specific temperature to a user has been proposed.

In this regard, Korean Patent Application Publication No. 10-2010-0018822 entitled "Water purifier for extracting water of specified temperature and control method for the same" (Patent Document 1) of the present applicant discloses a purified water tank, a hot water tank, a purified water extraction valve, a hot water extraction valve, and a connection section. In Patent Document 1, in order to control the temperature of the water discharged from the water purifier, the purified water extraction valve and the hot water extraction valve are controlled to adjust the amount of purified water discharged from the purified water tank and the amount of hot water discharged from the hot water tank, and the purified water and the hot water are mixed at the connection section to provide water at a specific temperature to a user.

However, in Patent Document 1, since the hot water in the hot water tank is always heated to a high temperature by a heater to maintain the preset hot water temperature, in order to provide lukewarm water to a user, purified water and hot water need to be mixed. In other words, since the hot water in the hot water tank is maintained only at the preset high temperature, when hot water at a medium temperature lower than the preset hot water temperature needs to be provided, there is the inconvenience of having to provide a mixture of purified water and hot water. In addition, since the hot water in the hot water tank is always heated to the high temperature by the heater, there is a problem in that energy costs increase due to constant heating of the hot water.

Further, Korean Patent Application Publication No. 10-2012-0097813 entitled "Water purifier capable of temperature control" (Patent Document 2) of the present applicant discloses a first tank, a second tank, a temperature control unit, and a discharge unit. In Patent Document 2, in order to control the temperature of the water discharged from the water purifier, the temperature control unit is controlled to adjust the amount of hot water discharged from the first tank and the amount of the cold water discharged from the second tank, and the hot water and the cold water are mixed in the discharge unit to provide water at a specific temperature to a user.

However, in Patent Document 2, since the hot water in the first tank is always heated to a high temperature by a heater to maintain the preset hot water temperature, in order to provide lukewarm water to a user, hot water and cold water need to be mixed. In other words, since the hot water in the first tank is maintained only at the preset high temperature, when hot water at a medium temperature lower than the preset hot water temperature needs to be provided, there is the inconvenience of having to provide a mixture of hot water and cold water. In addition, since the hot water in the first tank is always heated to the high temperature by the heater, there is a problem in that energy costs increase due to constant heating of the hot water.

SUMMARY

In view of the above, the present disclosure provides a water purifier in which hot water in a hot water module is heated to be maintained at a medium temperature, so that when a user selects hot water at the medium temperature, hot water at a medium temperature is provided to the user without mixing hot water and cold water.

In addition, the present disclosure provides a water purifier in which high-temperature water is provided to a user by instantaneously heating hot water in a hot water module when the user selects high-temperature water, thereby reducing energy costs because the hot water in the hot water module is not always heated to a high temperature.

In accordance with an embodiment of the present disclosure, there is provided a water purifier including: a water outlet unit for discharging water to an outside; a water temperature sensor for measuring a temperature of water discharged from the water outlet unit; a filter for filtering raw water to provide purified water; a cold water module for cooling the purified water to provide cold water; a hot water module including a heater for heating the purified water to provide hot water, and a hot water body providing a space which receives the hot water heated to a temperature higher than a temperature of cold water by the heater or through which the hot water flows; a flow channel connected to the water outlet unit, the filter, the cold water module, and the hot water module to provide a passage through which the purified water, the cold water, the hot water, and discharge water that is a mixture of the cold water and the hot water flow; a valve module including one or more valves that are selectively opened/closed to control the flow of the cold water, the hot water, and the discharge water in the flow channel; and a controller for controlling the valve module such that a temperature of the water discharged from the water outlet unit measured by the water temperature sensor is a target temperature, wherein the heater is disposed in a lower portion of the hot water body, and wherein the flow channel includes: a hot water discharge passage connected to the hot water body at the same height position as the heater or at a lower height position than the heater to provide a passage through which the hot water near the heater flows; and a mixed hot water supply passage connected to the hot water body above the heater and providing a passage through which the hot water above the heater flows to provide the hot water to be mixed in the discharge water.

Further, the cold water module may include: a cooler for cooling the purified water to provide the cold water; and a cold water body providing a space which receives the cold water cooled by the cooler or through which the cold water flows, the hot water body may be arranged such that a water level of hot water in the hot water body is lower than a water level of cold water in the cold water body, and the cold water in the cold water body may flow into the hot water body by a water level difference between the hot water body and the cold water body.

Further, the flow channel may further include: a body connection passage connected to a lower portion of the cold water body and an upper portion of the hot water body to provide a passage through which the cold water in the cold water body flows into the hot water body; a mixed cold water supply passage connected to the cold water body and the mixed hot water supply passage to provide a passage through which the cold water in the cold water body flows; a discharge water outflow passage connected to the mixed hot water supply passage, the mixed cold water supply passage, and the water outlet unit to provide a passage through which at least one of the hot water, the cold water and the discharge water flows to the water outlet unit; and a steam passage connected to an upper portion of the cold water body and an upper portion of the hot water body to provide a passage through which steam generated in the hot water body flows to the cold water body.

Further, the valve module may include: a hot water control valve for opening or closing the hot water discharge passage to allow or block a flow of the hot water in the hot water discharge water passage; a mixed hot water valve for opening or closing the mixed hot water supply passage to allow or block a flow of the hot water in the mixed hot water supply passage; a mixed cold water valve for opening or closing the mixed cold water supply passage to allow or block a flow of the cold water in the mixed cold water supply passage, and adjusting a flow rate of the cold water flowing through the mixed cold water supply passage when the flow of the cold water is allowed; a water outlet valve for opening or closing the discharge water outflow passage to allow or block a flow of at least one of the hot water, the cold water, and the discharge water in the discharge water outflow passage; and a shutoff valve for opening or closing the body connection passage.

Further, the hot water module may further include a plurality of partition walls extending in one direction in the hot water body to provide a passage through which the cold water flows to the heater, the heater may be disposed below the partition wall, and the mixed hot water supply passage may be connected to the hot water body above the partition wall.

Further, the partition wall may be disposed in a lower portion of the hot water body, and an upper portion of the hot water body partitioned by the partition wall may have a larger volume than the lower portion of the hot water body.

Further, the plurality of partition walls may include a first partition wall and a second partition wall, the first partition wall and the second partition wall may be arranged alternately in an up-down direction, the first partition wall may extend from one side of the hot water body toward the other side of the hot water body, and the second partition wall may extend from the other side of the hot water body toward the one side of the hot water body.

Further, the water purifier may further include: a hot water temperature sensor disposed above the partition wall to measure a temperature of the hot water in the hot water body; and a high-temperature water temperature sensor disposed below the partition wall to measure a temperature of the hot water near the heater, wherein the controller controls the heater such that the temperature of hot water measured by the hot water temperature sensor satisfies a set temperature condition.

Further, a hot water discharge mode in which hot water is discharged to the water outlet unit may include: a medium-temperature water discharge mode in which a target temperature condition satisfies the set temperature condition of the hot water temperature sensor; and a high-temperature water discharge mode in which the target temperature condition is set to a higher temperature than the target temperature condition in the medium-temperature water discharge mode and hot water is discharged, wherein in the high-temperature water discharge mode, the controller controls the heater to heat the hot water to a target temperature, and controls the hot water control valve to be opened so that the heated hot water flows through the hot water discharge passage to the water outlet unit, and wherein in the medium-temperature water discharge mode, the controller controls the mixed hot water valve to be opened so that the hot water flows through the mixed hot water supply passage to the discharge water outflow passage, and controls the water outlet valve to be opened so that the hot water flows to the water outlet unit.

Further, in a discharge water outflow mode in which the discharge water is discharged to the water outlet unit, the controller may control the mixed hot water valve to be opened so that the hot water flows through the mixed hot water supply passage to the discharge water outflow passage, control the mixed cold water valve to be opened so that the cold water flows through the mixed cold water supply passage to the discharge water outflow passage, control the water outlet valve to be opened so that the discharge water that is a mixture of the hot water and the cold water flows to the water outlet unit, and control at least one of the mixed hot water valve and the mixed cold water valve to adjust a mixing ratio of the cold water and the hot water flowing through the discharge water outflow passage so that a temperature of the discharge water flowing to the water outlet unit satisfies a target temperature condition.

Further in a cold water discharge mode in which the cold water is discharged to the water outlet unit, the controller may control the mixed cold water valve to be opened so that the cold water flows through the mixed cold water discharge passage to the discharge water outflow passage, control the hot water control valve and the mixed hot water valve to be closed, and control the water outlet valve to be opened so that the cold water flows to the water outlet unit.

Further, the flow channel may further include a cold water discharge passage connected to the cold water body and the water outlet unit to provide a passage through which the cold water in the cold water body flows to the water outlet unit, the valve module may further include a cold water valve for opening or closing the cold water discharge passage to allow or block the flow of the cold water in the cold water discharge passage, and in a cold water discharge mode in which cold water is discharged to the water outlet unit, the controller may control the hot water control valve and the mixed hot water valve to be closed, and controls the cold water valve to be opened so that the cold water flows to the water outlet unit.

According to embodiments of the present disclosure, when a user selects hot water at a medium temperature, by providing the user with hot water maintained at the medium temperature in the hot water body, it is possible to provide the user with water at a target temperature by mixing cold water with hot water at a higher temperature or hot water at a relatively lower temperature.

In addition, according to embodiments of the present disclosure, when the user selects hot water at a high-temperature, high-temperature water is provided to the user by instantaneously heating hot water in the hot water body, so that the hot water in the hot water body is not always heated to the high temperature, which results in reduction of energy costs.

Further, according to embodiments of the present disclosure, since water to be heated in the hot water body is supplied from the cold water body, a separate purified water tank is not required, which reduces the overall size of the water purifier.

In addition, according to embodiments of the present disclosure, the heater is disposed below the partition wall, and the mixed hot water supply passage through which the medium-temperature water flows is connected to the hot water body above the partition wall, so that even when the heater is instantaneously heated, the temperature of the medium-temperature water above the partition wall hardly changes, which minimizes the temperature change of the medium-temperature water flowing through the mixed hot water supply passage.

DETAILED DESCRIPTION

Hereinafter, specific embodiments for implementing a spirit of the present disclosure will be described in detail with reference to the drawings.

In describing the present disclosure, detailed descriptions of known configurations or functions may be omitted to clarify the present disclosure.

When an element is referred to as being 'connected' to, or 'supplied' to another element, it should be understood that the element may be directly connected to, or supplied to another element, but that other elements may exist in the middle.

The terms used in the present disclosure are only used for describing specific embodiments, and are not intended to limit the present disclosure. Singular expressions include plural expressions unless the context clearly indicates otherwise.

Further, in the present disclosure, it is to be noted that expressions, such as the upper side, the lower side, and the side surface are described based on the illustration of drawings, but may be modified if directions of corresponding objects are changed. For the same reasons, some components are exaggerated, omitted, or schematically illustrated in the accompanying drawings, and the size of each component does not fully reflect the actual size.

Terms including ordinal numbers, such as first and second, may be used for describing various elements, but the corresponding elements are not limited by these terms.

These terms are only used for the purpose of distinguishing one element from another element.

In the present specification, it is to be understood that the terms such as "including" are intended to indicate the existence of the certain features, areas, integers, steps, actions, elements, combinations, and/or groups thereof disclosed in the specification, and are not intended to preclude the possibility that one or more other certain features, areas, integers, steps, actions, elements, combinations, and/or groups thereof may exist or may be added.

Hereinafter, the specific configuration of a water purifier 10 according to one embodiment of the present disclosure will be described with reference to the drawings.

Figure 1:
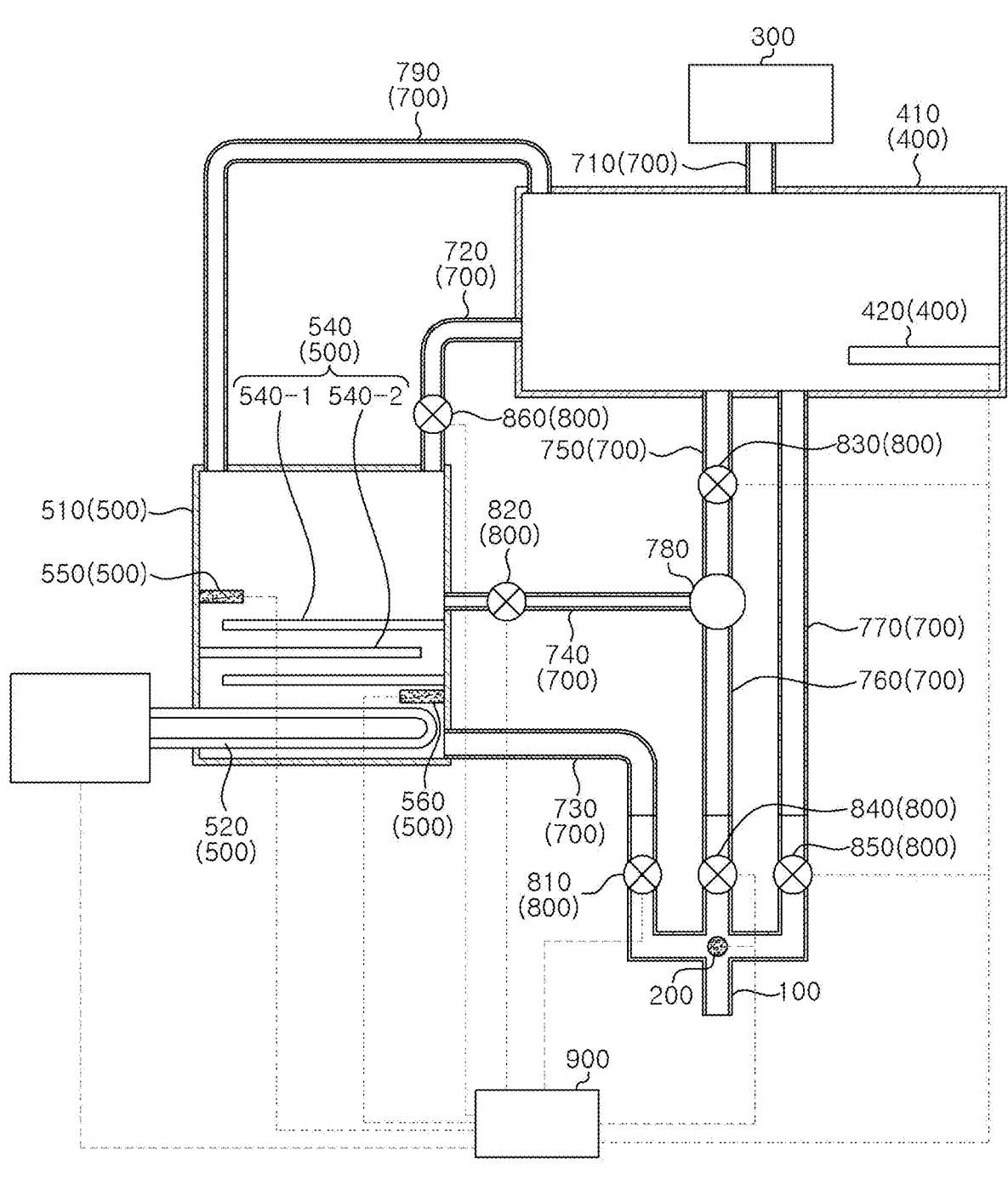
FIG. 1 is a diagram showing a water purifier according to one embodiment of the present disclosure.

Referring to FIG. 1, the water purifier 10 according to one embodiment of the present disclosure can provide clean water to a user by filtering water supplied from the outside. For example, the water purifier 10 may receive water from a water source (not shown) such as a tap water, and may filter the supplied water into clean water. The water purifier 10 includes a water outlet unit 100, a water temperature sensor 200, a filter 300, a cold water module 400, a hot water module 500, a flow channel 700, a valve module 800, and a controller 900.

The water outlet unit 100 may discharge water to the outside of the water purifier 10 to provide one or more of cold water, hot water, and discharge water to a user. The water outlet unit 100 is in communication with the cold water module 400 and the hot water module 500 through the flow channel 700, and receives one or more of cold water, hot water, and discharge water to discharge the water to the outside of the water purifier 10. The water outlet unit 100 may be disposed on an outer surface of the water purifier 10 to discharge water one or more of cold water, hot water, and discharge water by the user's manipulation. The hot water discharged from the water outlet unit 100 may include high-temperature water and medium-temperature water.

The water temperature sensor 200 can measure the temperature of water discharged from the water outlet unit 100. The water temperature sensor 200 may be disposed in the water outlet unit 100 or in the flow channel 700 on a downstream side of the valve module 800 to measure the temperature of water discharged through the water outlet unit 100.

The filter 300 can provide purified water by filtering water introduced from the outside of the water purifier 10. The filter 300 may be provided as a UF (ultrafiltration) filter, an NT (nano trap) filter, an RO (reverse osmosis) filter, etc., and may be provided in plurality. The filter 300 may be connected to the water source through a raw water inflow passage (not shown) to be described later of the flow channel 700 to receive raw water from the water source. The raw water flowing into the filter 300 may be filtered by the filter 300 and provided as purified water. The filter 300 may include a plurality of filters 300, and the plurality of filters 300 may include a pre-processing filter and a post-processing filter.

The cold water module 400 may provide cold water by cooling the purified water provided by the filter 300. The cold water module 400 may include a cold water body 410 and a cooler 420.

The cold water body 410 may provide a space for receiving cold water, or may provide a space through which cold water flows. The cold water body 410 may be connected to the filter 300 through the purified water supply passage 710 to receive purified water filtered by the filter 300. The cold water body 410 may have a tank or pipe shape.

The cooler 420 may cool purified water flowing from the filter 300 to the cold water body 410 through the purified water supply passage 710. The cooler 420 may be disposed inside the cold water body 410 to provide cold water by cooling purified water flowing into the cold water body 410.

The hot water module 500 may provide hot water by heating the cold water provided by the cold water module 400. The hot water module 500 may include a hot water body 510, a heater 520, a partition wall 540, a hot water temperature sensor 550, and a high-temperature water temperature sensor 560.

The hot water body 510 may provide a space for receiving hot water. The hot water body 510 may be connected to the cold water body 410 through a body connection passage 720 to receive cold water discharged from the cold water body 410. The hot water body 510 may be disposed below the cold water body 410, and the body connection passage 720 may be arranged to connect a lower portion of a side surface of the cold water body 410 and an upper portion of the hot water body 510. Accordingly, cold water may free-fall through the body connection passage 720 and flow into the hot water body 510. The hot water body 510 may have a tank or pipe shape.

The heater 520 may provide hot water by heating cold water flowing in the hot water body 510. The heater 520 may be disposed in a lower side of the hot water body 510. The heater 520 may be operated in a normal heating mode that heats the water inside the hot water body 510 for a relatively long time, and in an instantaneous heating mode that instantly heats the water in the lower side of the hot water body 510 to a higher temperature for a shorter period of time than the normal heating mode by using a higher power than the normal heating mode. For example, in the normal heating mode, the heater 520 may always heat the water inside the hot water body 510 so that the temperature of the water inside the hot water body 510 measured by the hot water temperature sensor 550 satisfies a set temperature condition. The set temperature condition may be a temperature condition when the temperature of the water inside the hot water body 510 is about 60° C. to 70° C. In addition, in the instantaneous heating mode, the heater 520 may instantaneously heat the water in the lower portion of the hot water body 510 such that the temperature of the water in the lower side of the hot water body 510, as measured by the high-temperature water temperature sensor 560, is a high temperature condition higher than the set temperature condition. The high temperature condition may be a temperature condition when the temperature of the water in the lower side of the hot water body 510 is about 90° C. The heater 520 may be placed below the partition wall 540.

The partition wall 540 may extend in one direction in the hot water body 510 to provide a passage through which cold water flowing into the hot water body 510 flows to the heater 520. The partition wall 540 is disposed in the lower side of the hot water body 510 to partition the interior of the hot water body 510 into upper and lower sections. The upper section in the hot water body 510 partitioned by the partition wall 540 may have a larger volume than the lower section in the hot water body 510.

The partition wall 540 may include a plurality of partition walls. For example, the partition wall 540 may include a first partition wall 540-1 and a second partition wall 540-2. The first partition wall 540-1 and the second partition wall 540-2 may be alternately arranged in the up-down direction of the hot water body 510. The first partition wall 540-1 may extend from one side of the hot water body 510 toward the other side of the hot water body 510. An end of the first partition wall 540-1 may be spaced apart from the other side of the hot water body 510 to form a space between the first partition wall 540-1 and the other side of the hot water body 510. In addition, the second partition wall 540-2 may extend from the other side of the hot water body 510 toward one side of the hot water body 510. An end of the second partition wall 540-2 may be spaced apart from one side of the hot water body 510 to form a space between the second partition wall 540-2 and one side of the hot water body 510. The interior of the hot water body 510 may be partitioned into the upper section and the lower section by the first partition wall 540-1 and the second partition wall 540-2 described above, and a passage may be provided to allow cold water flowing into the hot water body 510 to flow to the heater 520.

The hot water temperature sensor 550 may measure the temperature of the water inside the hot water body 510. The hot water temperature sensor 550 may be disposed closer to an inlet of the hot water body 510 than to an outlet of the hot water body 510. For example, when the hot water body 510 is configured so that water flows in from the top and discharges from the bottom, the hot water temperature sensor 550 is disposed above the partition wall 540 in the hot water body 510 to measure the temperature of the water flowing above the partition wall 540.

The high-temperature water temperature sensor 560 may measure the temperature of water flowing below the partition wall 540 in the hot water body 510. The high-temperature water temperature sensor 560 may be disposed below the partition wall 540 in the hot water body 510 where the heater 520 is disposed. In addition, the high-temperature water temperature sensor 560 may be disposed, below the partition wall 540 in the hot water body 510, near a point where a hot water discharge passage 730 is connected. Since the high-temperature water temperature sensor 560 is disposed adjacent to the heater 520, it can measure the temperature of hot water near the heater 520. The flow channel 700 may be connected to the water outlet unit 100, the filter 300, the cold water module 400 and the hot water module 500 to provide a passage through which purified water, cold water, hot water, and discharge water that is a mixture of cold water and hot water flow. The flow channel 700 may include a raw water inflow passage, a purified water supply passage 710, a body connection passage 720, a hot water discharge passage 730, a mixed hot water supply passage 740, a mixed cold water supply passage 750, and a discharge water outflow passage 760, a cold water discharge passage 770, a mixing passage 780, and a steam passage 790.

The raw water inflow passage may provide a passage through which raw water flowing in from the outside of the water purifier 10 flows to the filter 300. The raw water inflow passage may be connected to an external water source of the water purifier 10 and the filter 300. In other words, raw water may flow from the water source to the filter 300 through the raw water inflow passage.

The purified water supply passage 710 may provide a passage through which purified water provided through the filter 300 flows to the cold water body 410. The purified water supply passage 710 may be connected to the filter 300 and the cold water body 410. In other words, purified water may flow from the filter 300 to the cold water body 410 through the purified water supply passage 710.

The body connection passage 720 may provide a passage through which cold water flows from the cold water body 410 to the hot water body 510. The body connection passage 720 may be connected to a lower portion of a side surface of the cold water body 410 and an upper portion of the hot water body 510. In other words, cold water may free-fall through the body connection passage 720 and flow from the cold water body 410 to the hot water body 510.

The hot water discharge passage 730 may provide a passage through which high-temperature water flows so that high-temperature water, which is hot water in the lower side of the hot water body 510, flows to the water outlet unit 100. The hot water discharge passage 730 may be connected to a lower portion of a side surface of the hot water body 510 and the water outlet unit 100. In other words, the hot water discharge passage 730 may be connected to the hot water body 510 at the same height as the heater 520 or at a lower height than the heater 520 to provide a passage for high-temperature water near the heater 520 to flow to the water outlet unit 100.

The mixed hot water supply passage 740 may provide a passage through which medium-temperature water flows so that medium-temperature water, which is hot water in a middle side of the hot water body 510, flows into the mixing passage 780. The mixed hot water supply passage 740 may be connected to a middle portion of the side surface of the hot water body 510 and the mixing passage 780. In other words, the mixed hot water supply passage 740 may be connected to the hot water body 510 at a position above the heater 510 to provide a passage through which medium-temperature water above the heater 520 flows to the mixing passage 780. The mixed hot water supply passage 740 may be connected to the hot water body 510 at a position above the partition wall 540.

The mixed cold water supply passage 750 may provide a passage through which cold water flows so that the cold water in the cold water body 410 flows to the mixing passage 780. The mixed cold water supply passage 750 may be connected to the cold water body 410 and the mixing passage 780. In other words, cold water may flow from the cold water body 410 to the mixing passage 780 through the mixed cold water supply passage 750.

The discharge water outflow passage 760 may provide a passage through which one or more of medium-temperature water, cold water, and discharge water that is a mixture of intermediate hot water and cold water flow so that one or more of the medium-temperature water, cold water, and discharge water flowing into the mixing passage 780 flow to the water outlet unit 100. The discharge water outflow passage 760 may be connected to the mixing passage 780 and the water outlet unit 100. In other words, one or more of medium-temperature water, cold water, and discharge water may flow from the mixing passage 780 to the water outlet unit 100 through the discharge water outflow passage 760.

The cold water discharge passage 770 may provide a passage through which cold water flows so that the cold water in the cold water body 410 flows to the water outlet unit 100. The cold water discharge passage 770 may be connected to the cold water body 410 and the water outlet unit 100. In other words, cold water may flow from the cold water body 410 to the water outlet unit 100 through the cold water discharge passage 770.

The mixing passage 780 may provide a passage through which one or more of medium-temperature water, cold water, and discharged water flow so that any one of medium-temperature water flowing through the mixed hot water supply passage 740, cold water flowing through the mixed cold water supply passage 750, and discharge water that is a mixture of the medium-temperature water and the cold water flow into the discharge water outflow passage 760. In addition, the mixing passage 780 may provide a space where medium-temperature water and cold water are mixed. The mixing passage 780 may be connected to the mixed hot water supply passage 740, the mixed cold water supply passage 750, and the discharge water outflow passage 760. In other words, at least one of the medium-temperature water flowing through the mixed hot water supply passage 740, the cold water flowing through the mixed cold water supply passage 750, and the discharge water flows from the mixing passage 780 to the discharge water outflow passage 760.

The steam passage 790 may provide a passage through which steam generated in the hot water body 510 flows to the cold water body 410. The steam passage 790 may be connected to an upper portion of the cold water body 410 and an upper portion of the hot water body 510. As the hot water in the hot water body 510 is heated, steam may be generated. The steam generated in the hot water body 510 may flow from the hot water body 510 to the cold water body 410 through the steam passage 790.

The valve module 800 may include one or more valves that are selectively opened/closed to control the flow of cold water, hot water, and discharge water in the flow channel 700. The valve module 800 may include a hot water control valve 810, a mixed hot water valve 820, a mixed cold water valve 830, a water outlet valve 840, a cold water valve 850, and a shutoff valve 860.

The hot water control valve 810 may be opened/closed to control the flow of high-temperature water through the hot water discharge passage 730. In other words, when the hot water control valve 810 is opened, high-temperature water can flow from the lower side in the hot water body 510 to the water outlet unit 100 through the hot water discharge passage 730.

The mixed hot water valve 820 may be opened/closed to control the flow of medium-temperature water through the mixed hot water supply passage 740. In other words, when the mixed hot water valve 820 is opened, medium-temperature water can flow from the middle side in the hot water body 510 to the mixing passage 780 through the mixed hot water supply passage 740.

The mixed cold water valve 830 may be opened/closed to control the flow of cold water through the mixed cold water supply passage 750. In other words, when the mixed cold water valve 830 is opened, cold water can flow from the cold water body 410 to the mixing passage 780 through the mixed cold water supply passage 750. The mixed cold water valve 830 can control the flow rate of cold water flowing through the mixed cold water passage 750. For example, an opening/closing degree of the mixed cold water valve 830 may be controlled by the controller 900, and the flow rate of cold water flowing through the mixed cold water passage 750 may be controlled according to the opening/closing degree of the mixed cold water valve 830.

The water outlet valve 840 may be opened/closed to control the flow of any one of medium-temperature water, cold water, and discharge water through the discharge water outflow passage 760. In other words, when the water outlet valve 840 is opened, any one of medium-temperature water, cold water, and discharge water may flow from the mixing passage 780 to the water outlet unit 100 through the discharge water outflow passage 760.

The cold water valve 850 may be opened/closed to control the flow of cold water through the cold water discharge passage 770. In other words, when the cold water valve 850 is opened, cold water may flow from the cold water body 410 to the water outlet unit 100 through the cold water discharge passage 770.

The shutoff valve 860 may be opened/closed to control the flow of cold water in the cold water body 410 through the body connection passage 720. In addition, the shutoff valve 860 may be closed to prevent hot water in the hot water body 510 from flowing into the cold water body 410 through the body connection passage 720. For example, in a state in which water is not fully filled in the hot water body 510, the shutoff valve 860 can be opened to allow the cold water in the cold water body 510 to flow into the hot water body 510 through the body connection passage 720. On the other hand, in a state in which water is fully filled in the hot water body 510, the shutoff valve 860 can be closed to prevent the hot water in the hot water body 510 from flowing to the cold water body 410 through the body connection passage 720.

The controller 900 may control the valve module 800 such that the temperature of water discharged from the water outlet unit 100 measured by the water temperature sensor 200 satisfies a target temperature condition. The target temperature condition may be a water temperature condition required by a user, and the target temperature condition may be selected by the user each time water is discharged from the water purifier 10. The controller 900 may control the opening/closing of the valve module 800 based on one or more flow modes. The one or more flow modes may include a hot water discharge mode, a discharge water outflow mode, and a cold water discharge mode. In addition, the hot water discharge mode may include a medium-temperature water discharge mode and a high-temperature water discharge mode.

When the target temperature condition selected by the user satisfies the set temperature condition, the controller 900 may control the opening/closing of the valve module 800 based on the medium-temperature water discharge mode. In the medium-temperature water discharge mode, the controller 900 may control the mixed hot water valve 820 and the water outlet valve 840 to be opened, and control the hot water control valve 810, the mixed cold water valve 830, and the cold water valve 850 to be closed. When the target temperature condition selected by the user is included in the set temperature condition, the controller 900 may control the mixed hot water valve 820 and the water outlet valve 840 to be opened. For example, when the set temperature condition is that the temperature of the water in the hot water body 510 is about 60° C. to 70° C., and the target temperature condition is set to 65° C., the controller 900 may control the mixed hot water valve 820 and the water outlet valve 840 to be opened.

In addition, when the target temperature condition selected by the user is a temperature condition higher than the set temperature condition, the controller 900 may control the opening/closing of the valve module 800 based on the high-temperature water discharge mode. In the high-temperature water discharge mode, the controller 900 may control the hot water control valve 810 to be opened, and control the mixed hot water valve 820, the mixed cold water valve 830, the water outlet valve 840, and the cold water valve 850 to be closed. For example, when the target temperature condition selected by the user is 90° C., since the target temperature condition is a temperature condition higher than the set temperature condition, the controller 900 may operate the heater 520 such that the temperature of water near the heater 520 measured by the high temperature water temperature sensor 560 is 90° C. In this way, when the temperature of the water near the heater 520 is satisfied to be about 90° C., the controller 900 may control the hot water control valve 810 to be opened.

In addition, when the target temperature condition selected by the user is lower than the set temperature condition and higher than the temperature of the cold water in the cold water body 410, the controller 900 may control the opening/closing of the valve module 800 based on the discharge water outflow mode. In the discharge water outflow mode, the controller 900 may control the mixed hot water valve 820, the mixed cold water valve 830, and the water outlet valve 840 to be opened, and control the hot water control valve 810 and the cold water valve 850 to be closed. For example, when the target temperature condition selected by the user is about 30° C., since the target temperature condition is lower than the set temperature condition and higher than the cold water temperature of about 10° C., the controller 900 may control the mixed hot water valve 820, the mixed cold water valve 830, and the water outlet valve 840 to be opened. The controller 900 may control at least one of the mixed hot water valve 820 and the mixed cold water valve 830 to adjust the mixing ratio of the medium-temperature water and the cold water so that the temperature of the discharge water flowing into the water outlet unit 100 measured by the water temperature sensor 200 satisfies the target temperature condition.

In addition, when the target temperature condition selected by the user satisfies the temperature of the cold water in the cold water body 410, the controller 900 may control the opening/closing of the valve module 800 based on the cold water discharge mode. In the cold water discharge mode, the controller 900 may control the mixed cold water valve 830 and the water outlet valve 840 to be opened, and control the hot water control valve 810, the mixed hot water valve 820, and the cold water valve 850 to be closed. For example, when the target temperature condition selected by the user is about 10° C., since the target temperature condition satisfies 10° C., which is the temperature of cold water, the controller 900 may control the mixed cold water valve 830 and the water outlet valve 840 to be opened. Further, in the cold water discharge mode, the controller 900 may control the cold water valve 850 to be opened, and control the hot water control valve 810, the mixed hot water valve 820, the mixed cold water valve 830, and the water outlet valve 840 to be closed In addition, the controller 900 may control the heater 520 based on one or more operating modes. The one or more operating modes may include a normal heating mode and an instantaneous heating mode. In the normal heating mode, the controller 900 may operate the heater 520 so that the temperature of the water flowing in the middle side of the hot water body 510 measured by the hot water temperature sensor 550 satisfies the set temperature condition. For example, when the set temperature condition is about 60° C. to 70° C., the controller 900 may control the heater 520 to operate until the water temperature measured by the hot water temperature sensor 550 becomes a temperature within the range of about 60° C. to 70° C. When the temperature of the water measured by the hot water temperature sensor 550 reaches the set temperature condition, the controller 900 may control the heater 520 to stop operating. In this way, the controller 900 controls the operation of the heater 520 based on the normal heating mode, so that the temperature of the water flowing in the middle side of the hot water body 510 can always satisfy the set temperature condition.

Further, in the instantaneous heating mode, the controller 900 may control the heater 520 so that the temperature of the water flowing in the lower side of the hot water body 510 measured by the high-temperature water temperature sensor 560 satisfies the target temperature condition. For example, when the target temperature condition is a temperature condition higher than the set temperature condition, the controller 900 may operate the heater 520 to instantaneously heat the water flowing in the lower side of the hot water body 510. For example, when the target temperature condition is about 90° C., the controller 900 may control the heater 520 to instantaneously heat the water flowing in the lower side of the hot water body 510 until the temperature of the water measured by the high-temperature water temperature sensor 560 becomes about 90° C. When the temperature of the water measured by the high-temperature water temperature sensor 560 reaches the target temperature condition, the controller 900 may control the heater 520 to stop instantaneously heating the water.

Hereinafter, with reference to FIGS. 2 to 6, the flow mode of the water purifier 10 according to one embodiment of the present disclosure will be described.

Figure 2:
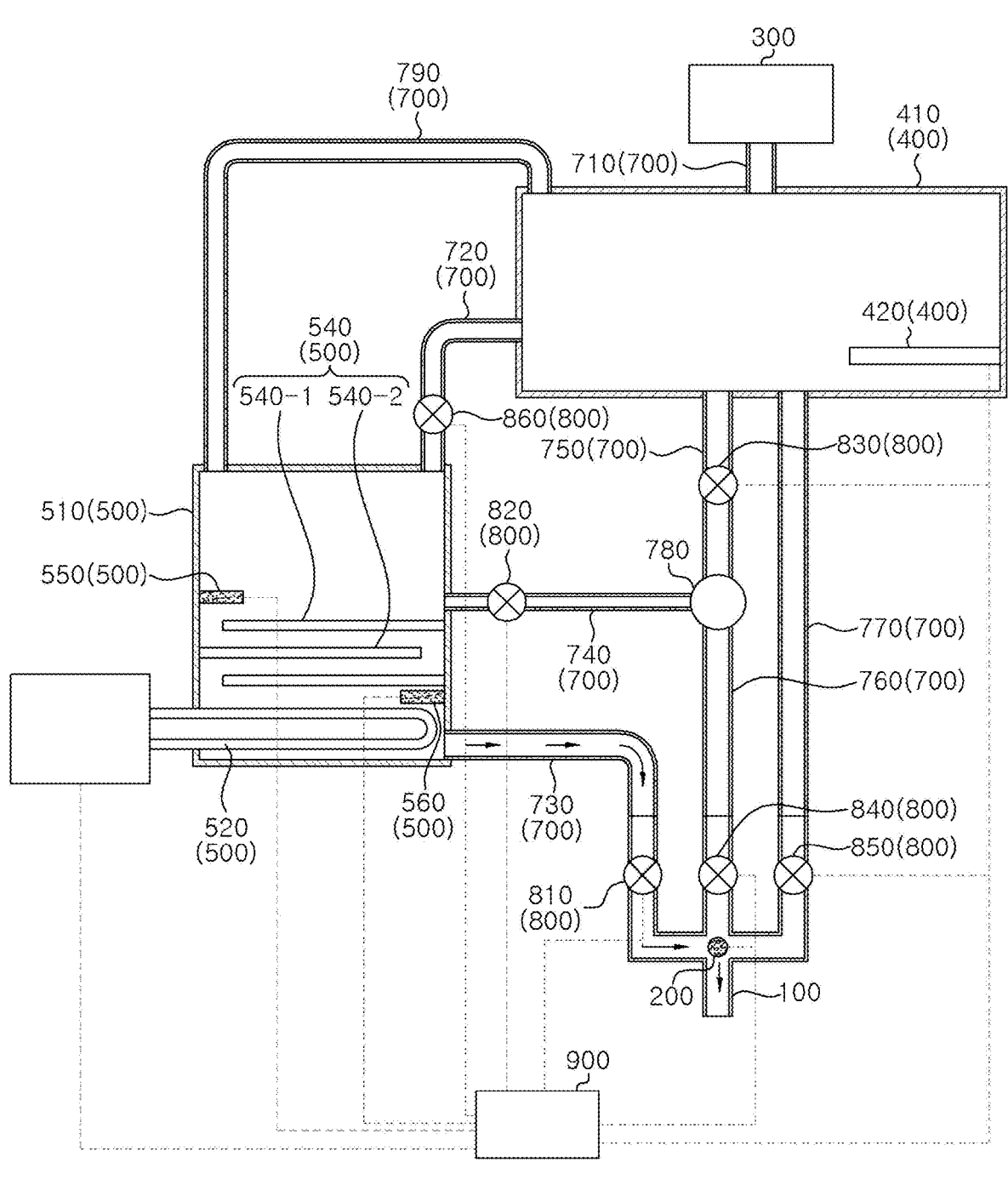
FIG. 2 is a diagram showing the flow path of water when in a high-temperature water discharge mode in FIG. 1.

Referring to FIG. 2, in the high-temperature water discharge mode where the target temperature condition is higher than the set temperature condition, the controller 900 operates the heater 520 to instantaneously heat the water flowing in the lower side of the hot water body 510. The high-temperature water instantaneously heated by the heater 520 may flow through the hot water discharge passage 730 and flow to the water outlet unit 100. In the high-temperature water discharge mode, the hot water control valve 810 may be opened, and the mixed hot water valve 820, the mixed cold water valve 830, the water outlet valve 840, and the cold water valve 850 may be closed. In this way, since the hot water control valve 810 is opened, high-temperature water flowing in the lower side of the hot water body 510 can flow to the water outlet unit 100 through the hot water discharge passage 730. The high-temperature water flowing to the water outlet unit 100 may be discharged from the water outlet unit 100 by a user's manipulation and provided to the user.

Figure 3:
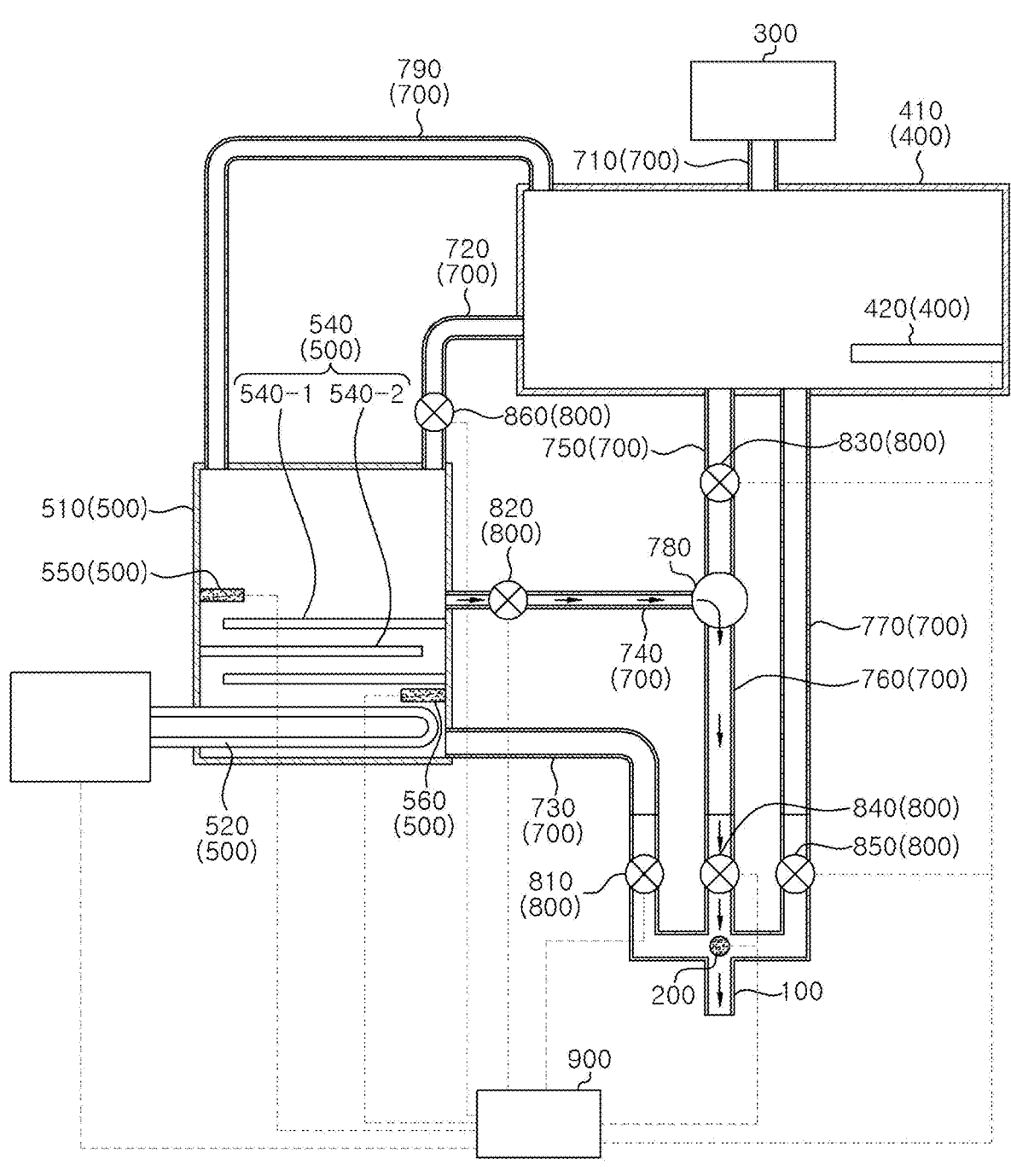
FIG. 3 is a diagram showing the flow path of water when in a medium temperature water discharge mode in FIG. 1.

Referring to FIG. 3, in the medium-temperature water discharge mode where the target temperature condition satisfies the set temperature condition, the medium-temperature water may flow through the mixed hot water supply passage 740, the mixing passage 780, and the discharge water outflow passage 760 to the water outlet unit 100. In the medium-temperature water discharge mode, the mixed hot water valve 820 and the outlet water valve 840 may be opened, and the hot water control valve 810, the mixed cold water valve 830, and the cold water valve 850 may be closed. In this way, the mixed hot water valve 820 and the water outlet valve 840 are opened, so the medium-temperature water flowing in the middle side of the hot water body 510 can flow through the mixed hot water supply passage 740, the mixing passage 780, and the discharge water outflow passage 760 to the water outlet unit 100. The medium-temperature water flowing to the water outlet unit 100 may be discharged from the water outlet unit 100 by the user's manipulation and provided to the user.

Figure 4:
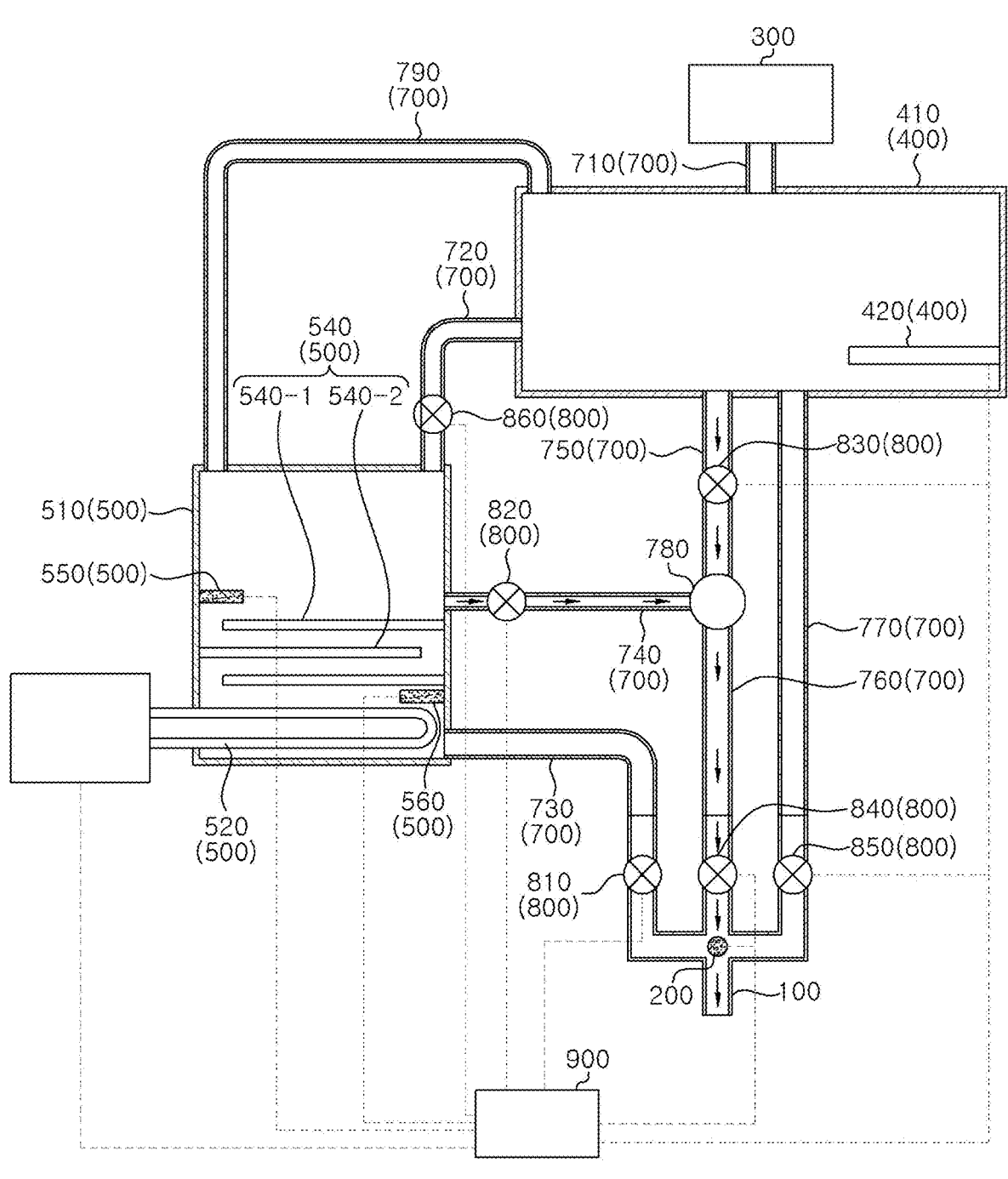
FIG. 4 is a diagram showing the flow path of water when in a discharge water outflow mode in FIG. 1.

Referring to FIG. 4, in the discharge water outflow mode where the target temperature condition is lower than the set temperature condition and higher than the temperature of the cold water in the cold water body 410, the medium-temperature water may flow through the mixed hot water supply passage 740 to the mixing passage 780, and the cold water may flow through the mixed cold water supply passage 750 to the mixing passage 780. The medium-temperature water and the cold water flowing into the mixing passage 780 are mixed with each other and provided as discharge water, and the discharge water may flow through the discharge water outflow passage 760 to the water outlet unit 100. In the discharge water outflow mode, the mixed hot water valve 820, the mixed cold water valve 830, and the water outlet valve 840 may be opened, and the hot water control valve 810 and the cold water valve 850 may be closed. In this way, the mixed hot water valve 820, the mixed cold water valve 830, and the water outlet valve 840 are opened, so the medium-temperature water and the cold water are mixed in the mixing passage 780, and the discharge water that is a mixture of the medium-temperature water and the cold water may flow through the discharge water outflow passage 760 to the water outlet unit 100. The discharge water flowing to the water outlet unit 100 may be discharged from the water outlet unit 100 by the user's manipulation and provided to the user.

Figure 5:
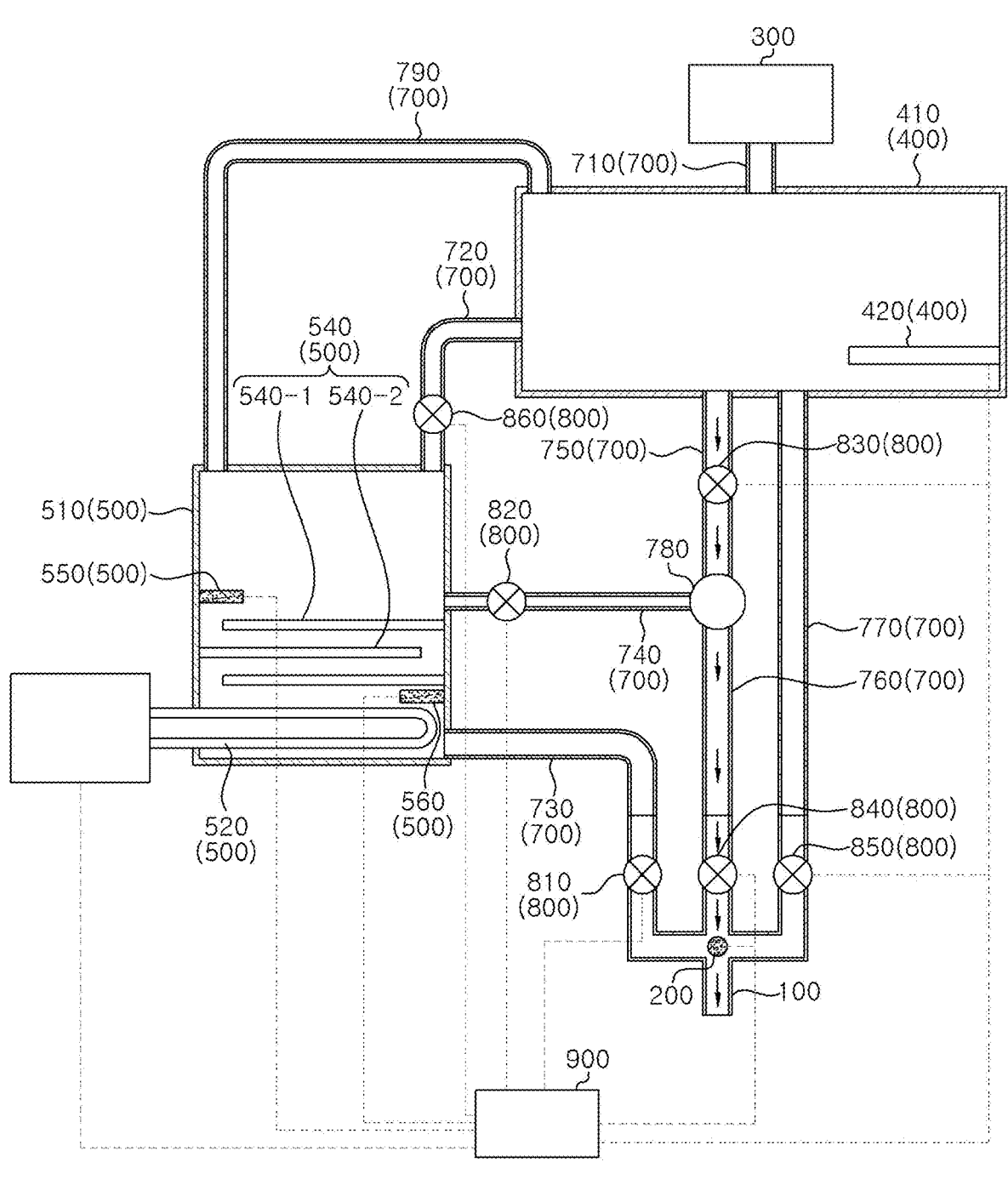
FIG. 5 is a diagram showing a state in which cold water flows to a water outlet unit through a mixed cold water supply passage and a discharge water outflow passage when in a cold water discharge mode in FIG. 1.

Referring to FIG. 5, in a first cold water discharge mode where the target temperature condition satisfies the temperature of the cold water in the cold water body 410, the cold water flows through the mixed cold water supply passage 750, the mixed passage 780, and the discharge water outflow passage 760 to the water outlet unit 100. In the first cold water discharge mode, the mixed cold water valve 830 and the water outlet valve 840 may be opened, and the hot water control valve 810, the mixed hot water valve 820, and the cold water valve 850 may be closed. In this way, the mixed cold water valve 830 and the water outlet valve 840 are opened, so cold water may flow through the mixed cold water supply passage 750, the mixing passage 780, and the discharge water outflow passage 760 to the water outlet unit 100. The cold water flowing to the water outlet unit 100 may be discharged from the water outlet unit 100 through the user's manipulation and provided to the user.

Figure 6:
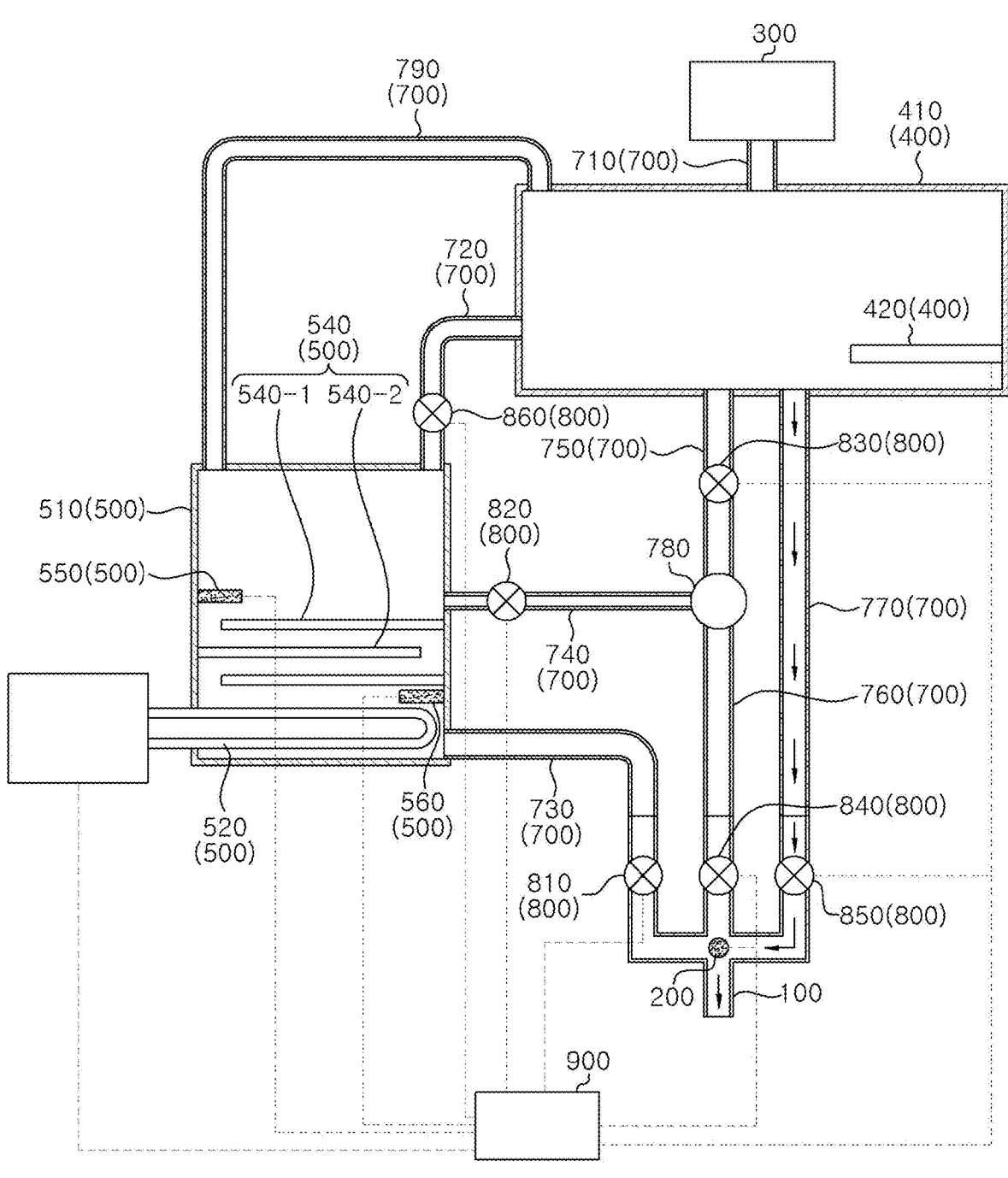
FIG. 6 is a diagram showing a state in which cold water flows to the water outlet unit through a cold water discharge passage when in the cold water discharge mode in FIG. 1.

Referring to FIG. 6, in a second cold water discharge mode where the target temperature condition satisfies the temperature of the cold water in the cold water body 410, the cold water may flow through the cold water discharge passage 770 to the water outlet unit 100. In the second cold water discharge mode, the cold water valve 850 may be opened, and the hot water control valve 810, the mixed hot water valve 820, the mixed cold water valve 830, and the water outlet valve 840 may be closed. In this way, since the cold water valve 850 is opened, cold water can flow through the cold water discharge passage 770 to the water outlet unit 100. The cold water flowing to the water outlet unit 100 may be discharged from the water outlet unit 100 through the user's operation and provided to the user.

Hereinafter, the operation and effects of the water purifier 10 according to one embodiment of the present disclosure will be described.

In the water purifier 10 according to one embodiment of the present disclosure, when the user selects hot water at a medium temperature, hot water maintained at the medium temperature in the hot water body 510 is provided to the user, so that it is possible to provide the user with water at a target temperature by mixing cold water with hot water at a higher temperature or hot water at a relatively lower temperature.

In addition, in the water purifier 10 according to one embodiment of the present disclosure, when the user selects hot water at a high-temperature, high-temperature water is provided to the user by instantaneously heating the hot water in the hot water body 510, so that the hot water in the hot water body 510 is not always heated to the high temperature, which results in reduction of energy costs.

In addition, in the water purifier 10 according to one embodiment of the present disclosure, since water to be heated in the hot water body 510 is supplied from the cold water body 410, a separate purified water tank is not required, which reduces the overall size of the water purifier 10.

In addition, in the water purifier 10 according to one embodiment of the present disclosure, the heater 520 is disposed below the partition wall 540, and the mixed hot water supply passage 740 through which medium-temperature water flows is connected to the hot water body 510 above the partition wall 540, so that even when the heater 520 is instantaneously heated, the temperature of the medium-temperature water above the partition wall 540 hardly changes, which minimizes the temperature change of the medium-temperature water flowing through the mixed hot water supply passage 740.

The examples of the present disclosure have been described above as specific embodiments, but these are only examples, and the present disclosure is not limited thereto, and should be construed as having the widest scope according to the technical spirit disclosed in the present specification. A person skilled in the art may combine/substitute the disclosed embodiments to implement a pattern of a shape that is not disclosed, but it also does not depart from the scope of the present disclosure. In addition, those skilled in the art can easily change or modify the disclosed embodiments based on the present specification, and it is clear that such changes or modifications also belong to the scope of the present disclosure.

What is claimed is:

1. A water purifier comprising:
a water outlet unit for discharging water to an outside;
a water temperature sensor for measuring a temperature of water discharged from the water outlet unit;
a filter for filtering raw water to provide purified water;
a cold water module for cooling the purified water to provide cold water;
a hot water module including a heater for heating the purified water to provide hot water, and a hot water body providing a space which receives the hot water heated to a temperature higher than a temperature of cold water by the heater or through which the hot water flows;
a flow channel connected to the water outlet unit, the filter, the cold water module, and the hot water module to provide a passage through which the purified water, the cold water, the hot water, and discharge water that is a mixture of the cold water and the hot water flow;
a valve module including one or more valves that are selectively opened/closed to control the flow of the cold water, the hot water, and the discharge water in the flow channel; and
a controller for controlling the valve module such that a temperature of the water discharged from the water outlet unit measured by the water temperature sensor is a target temperature,
wherein the heater is disposed in a lower portion of the hot water body, and
wherein the flow channel includes:
a hot water discharge passage connected to the hot water body at the same height position as the heater or at a lower height position than the heater to provide a passage through which the hot water near the heater flows; and
a mixed hot water supply passage connected to the hot water body above the heater and providing a passage through which the hot water above the heater flows to provide the hot water to be mixed in the discharge water.

2. The water purifier of claim 1, wherein the cold water module includes:
a cooler for cooling the purified water to provide the cold water; and
a cold water body providing a space which receives the cold water cooled by the cooler or through which the cold water flows,
wherein the hot water body is arranged such that a water level of hot water in the hot water body is lower than a water level of cold water in the cold water body, and
wherein the cold water in the cold water body flows into the hot water body by a water level difference between the hot water body and the cold water body.

3. The water purifier of claim 2, wherein the flow channel further includes:
a body connection passage connected to a lower portion of the cold water body and an upper portion of the hot water body to provide a passage through which the cold water in the cold water body flows into the hot water body;
a mixed cold water supply passage connected to the cold water body and the mixed hot water supply passage to provide a passage through which the cold water in the cold water body flows;
a discharge water outflow passage connected to the mixed hot water supply passage, the mixed cold water supply passage, and the water outlet unit to provide a passage through which at least one of the hot water, the cold water and the discharge water flows to the water outlet unit; and
a steam passage connected to an upper portion of the cold water body and an upper portion of the hot water body to provide a passage through which steam generated in the hot water body flows to the cold water body.

4. The water purifier of claim 3, wherein the valve module includes:
a hot water control valve for opening or closing the hot water discharge passage to allow or block a flow of the hot water in the hot water discharge water passage;
a mixed hot water valve for opening or closing the mixed hot water supply passage to allow or block a flow of the hot water in the mixed hot water supply passage;
a mixed cold water valve for opening or closing the mixed cold water supply passage to allow or block a flow of the cold water in the mixed cold water supply passage, and adjusting a flow rate of the cold water flowing through the mixed cold water supply passage when the flow of the cold water is allowed;
a water outlet valve for opening or closing the discharge water outflow passage to allow or block a flow of at least one of the hot water, the cold water, and the discharge water in the discharge water outflow passage; and
a shutoff valve for opening or closing the body connection passage.

5. The water purifier of claim 4, wherein the hot water module further includes a plurality of partition walls extending in one direction in the hot water body to provide a passage through which the cold water flows to the heater,
wherein the heater is disposed below the partition walls, and
wherein the mixed hot water supply passage is connected to the hot water body above the partition wall.

6. The water purifier of claim 5, wherein the partition walls is disposed in a lower portion of the hot water body, and an upper portion of the hot water body partitioned by the partition walls has a larger volume than the lower portion of the hot water body.

7. The water purifier of claim 5, wherein the plurality of partition walls include a first partition wall and a second partition wall, the first partition wall and the second partition wall are arranged alternately in an up-down direction, the first partition wall extends from one side of the hot water body toward the other side of the hot water body, and the second partition wall extends from the other side of the hot water body toward the one side of the hot water body.

8. The water purifier of claim 5, further comprising:

a hot water temperature sensor disposed above the partition walls to measure a temperature of the hot water in the hot water body; and a high-temperature water temperature sensor disposed below the partition walls to measure a temperature of the hot water near the heater, wherein the controller controls the heater such that the temperature of hot water measured by the hot water temperature sensor satisfies a set temperature condition.

9. The water purifier of claim 8, wherein a hot water discharge mode in which hot water is discharged to the water outlet unit includes:

a medium-temperature water discharge mode in which a target temperature condition satisfies the set temperature condition of the hot water temperature sensor; and a high-temperature water discharge mode in which the target temperature condition is set to a higher temperature than the target temperature condition in the medium-temperature water discharge mode and hot water is discharged, wherein in the high-temperature water discharge mode, the controller controls the heater to heat the hot water to a target temperature, and controls the hot water control valve to be opened so that the heated hot water flows through the hot water discharge passage to the water outlet unit, and wherein in the medium-temperature water discharge mode, the controller controls the mixed hot water valve to be opened so that the hot water flows through the mixed hot water supply passage to the discharge water outflow passage, and controls the water outlet valve to be opened so that the hot water flows to the water outlet unit.

10. The water purifier of claim 4, wherein in a discharge water outflow mode in which the discharge water is discharged to the water outlet unit, the controller controls the mixed hot water valve to be opened so that the hot water flows through the mixed hot water supply passage to the discharge water outflow passage, controls the mixed cold water valve to be opened so that the cold water flows through the mixed cold water supply passage to the discharge water outflow passage, controls the water outlet valve to be opened so that the discharge water that is a mixture of the hot water and the cold water flows to the water outlet unit, and controls at least one of the mixed hot water valve and the mixed cold water valve to adjust a mixing ratio of the cold water and the hot water flowing through the discharge water outflow passage so that a temperature of the discharge water flowing to the water outlet unit satisfies a target temperature condition.

11. The water purifier of claim 4, wherein in a cold water discharge mode in which the cold water is discharged to the water outlet unit, the controller controls the mixed cold water valve to be opened so that the cold water flows through the mixed cold water discharge passage to the discharge water outflow passage, controls the hot water control valve and the mixed hot water valve to be closed, and controls the water outlet valve to be opened so that the cold water flows to the water outlet unit.

12. The water purifier of claim 4, wherein the flow channel further includes a cold water discharge passage connected to the cold water body and the water outlet unit to provide a passage through which the cold water in the cold water body flows to the water outlet unit, wherein the valve module further includes a cold water valve for opening or closing the cold water discharge passage to allow or block the flow of the cold water in the cold water discharge passage, and wherein in a cold water discharge mode in which cold water is discharged to the water outlet unit, the controller controls the hot water control valve and the mixed hot water valve to be closed, and controls the cold water valve to be opened so that the cold water flows to the water outlet unit.

* * * * *